United States Patent [19]
Jacobson et al.

[11] Patent Number: 5,710,658
[45] Date of Patent: Jan. 20, 1998

[54] ACHROMATIC PHASE-MATCHING SECOND HARMONIC GENERATION FOR A TUNABLE LASER

[75] Inventors: Alexander Gerson Jacobson, Danville; Scott Bisson; Rick Trebino, both of Livermore, all of Calif.

[73] Assignee: Sandia Corporation, Albuquerque, N. Mex.

[21] Appl. No.: 574,607

[22] Filed: Dec. 13, 1995

Related U.S. Application Data

[63] Continuation-in-part of Ser. No. 489,473, Jun. 12, 1995.
[51] Int. Cl.$^6$ .................................................. G02F 1/37
[52] U.S. Cl. .............................. 359/328; 359/329
[58] Field of Search .......................... 359/326–332; 385/122; 372/21, 22

[56] References Cited

U.S. PATENT DOCUMENTS

| | | | |
|---|---|---|---|
| 5,333,142 | 7/1994 | Scheps | 372/22 |
| 5,377,043 | 12/1994 | Pelouch et al. | 359/326 |
| 5,477,378 | 12/1995 | Johnson | 359/326 |
| 5,493,628 | 2/1996 | Lawandy | 385/122 |

OTHER PUBLICATIONS

Martinez, "Achromatic Phase Matching for Second Harmonic Generation of Femtosecond Pulses", IEEE J. Q. E., 25, 2464–68 (Dec. 1989).

Szabo & Bor, "Broadband Frequency Doubler for Femtosecond Pulses", Appl. Phys. B (50), 51–54 (1990) [no month].

*Primary Examiner*—John D. Lee
*Attorney, Agent, or Firm*—Kurt C. Olsen; Timothy D. Stanley; Donald A. Nissen

[57] ABSTRACT

An optical system uses a nonlinear optical medium to alter the frequency of a relatively narrow band light source tunable over a plurality of different frequencies using an optical system for passively directing light to the nonlinear medium at a correct phase matching angle. In this manner, the light from the tunable light source can be efficiently frequency-doubled or frequency-tripled without the need of moving parts. An all prism design provides a system of optimal efficiency.

8 Claims, 4 Drawing Sheets

ACHROMATIC PHASE-MATCHING SECOND HARMONIC GENERATION FOR A TUNABLE LASER

This application is a continuation-in-part of applicants' copending application Ser. No. 08/489,473, filed Jun. 12, 1995 and entitled OPTIMIZED ACHROMATIC PHASE-MATCHING SYSTEM AND METHOD, the entire contents of which are incorporated herein by reference.

This invention was made with Government support under contract DE-AC04-94AL8500 awarded by the U.S. Department of Energy to Sandia Corporation. Pursuant to the provisions of the contract, the U.S. government has certain rights in the invention.

BACKGROUND OF THE INVENTION

This invention relates in general to a system and method for achieving efficient frequency-doubling of light emitted from a tunable laser, and more particularly to a system and method using achromatic phase-matching for directing the light emitted from the tunable laser to a nonlinear optical medium. It is noted that throughout this application, the term "optical" is used in its broadest sense as relating to light and the term "light" is used in its broadest sense to refer to electromagnetic radiation.

Many uses of laser light require the production of a plurality of different frequencies. A single, tunable narrow-band laser is often used to produce the different frequencies. The laser is then selectively tuned to a desired frequency as required by the particular application of the laser. Tunable lasers play an important role in many fields, such as laser radar (LIDAR), laser spectroscopy, and quality control. Often tunable systems must operate at wavelengths that are not available directly from a laser, and which instead must be produced using a nonlinear-optical process. The most common nonlinear processes are second-harmonic generation (SHG) and sum-frequency generation (SFG). Commonly, one performs SHG to generate the light frequency that is double that of the light emanating from the laser. Often, the light produced in this manner is then combined with the light directly from the laser using SFG to produce light at triple the frequency of the direct laser light. It would, therefore, be advantageous if SHG and SFG processes could be implemented for use with tunable laser light sources. However, as described below, conventional attempts to use SHG and SFG with a tunable light source have been generally unsuccessful.

The drawbacks of conventional attempts to use SHG and SFG with narrow-band tunable laser light will be better understood from the following description of the SHG process and the methods conventionally used.

In order for frequency-doubling to take place in a SHG crystal, the refractive index of the input laser light (at the "fundamental" wavelength) must equal the refractive index of the frequency-doubled light to be produced. The refractive index of a crystal varies both with the incidence angle and frequency of the input beam. Different incidence angles must be used, therefore, to obtain maximally efficient frequency-doubling for the different wavelengths. The angle vs. frequency requirement of the crystal will be referred to herein as the "phase-matching" condition.

The efficiency of a SHG process is strongly peaked with respect to angle for a given wavelength (i.e., frequency) and also with respect to wavelength for a given angle. Thus, only a small range of frequencies near the exact phase-matching frequency yield high efficiency for a given angle. The range of frequencies that achieves high-efficiency frequency-doubling for a single angle is called the crystal's "phase-matching bandwidth" for that angle. If the input laser is tuned to a frequency of light outside this bandwidth, the SHG crystal will not produce the corresponding second harmonic (i.e., the light will not be frequency-doubled).

The bandwidth over which the fundamental frequency of a tunable laser can be tuned (e.g., many nanometers in wavelength) is much larger than the bandwidth for efficient frequency-doubling of the SHG crystal at a particular angle (e.g., less than a nanometer). Accordingly, it is necessary to change the incidence angle as the fundamental frequency of the source light is changed (i.e., as the laser is tuned).

A conventional attempt to employ SHG and other non-linear processes with a tunable narrow-band laser source is depicted schematically in FIG. 1.

As illustrated in FIG. 1, conventional attempts to use an SHG crystal with a tunable laser source have attempted to correlate a rotation of the crystal in space and time with the tuning of the laser. In FIG. 1, a tunable laser 102 outputs a light beam 104 which is tunable, for example, to three different frequencies $\omega_1$ through $\omega_3$. The output from the tunable laser 102 is then made incident upon an SHG crystal 114. A rotation device 106 is provided to mechanically rotate the SHG crystal 114. The details of the apparatus used to rotate the SHG crystal 114 are not shown. As illustrated in FIG. 1, when the tunable laser is tuned to a frequency $\omega_1$ the SHG crystal 114 is tilted as illustrated by the solid line corresponding to the correct phase-matching angle for light at a frequency $\omega_1$. When the tunable laser 102 is tuned to the frequency $\omega_1$ and when the crystal is rotated to the correct phase-matching angle for light at the frequency $\omega_1$ relative to the input beam 104, the light output from the SHG crystal 114 is at a frequency of $2\omega_1$. Similarly, when the tunable laser 102 is tuned to frequencies $\omega_2$ or $\omega_3$ the SHG crystal 114 is rotated to the respective positions illustrated by the dotted lines in FIG. 1 which correspond to the phase-matching angle for the selected frequency. In this manner, the output from the SHG crystal 114 is respectively $2\omega_2$ or $2\omega_3$.

While the principle behind the apparatus depicted in FIG. 1 is relatively straight forward, practical implementation of such an apparatus is both difficult and expensive. Such a system is expensive because precise mechanical rotation mechanisms and control circuitry must be employed and precise feedback with the tunable laser 102 must be implemented. As illustrated in FIG. 1, the tunable laser 102 is connected to the rotation device 106 via line 108 to correlate the rotation of the SHG crystal 114 with the tuning of the tunable laser 102.

One problem associated with angle-tuning of the SHG crystal is that the rotation stage of the rotation device 106 containing the SHG crystal 114, must be accurately and rapidly tuned to the appropriate angle for each frequency. In practical use, it is extremely difficult to maintain this angle vs. frequency relation from day to day as a result of misalignments introduced by the rotation of the system. Another problem arises as the SHG crystal 114 is rotated to a new angle, since the beam undergoes Snell's Law refractions in the SHG crystal 114 and walks in position by as much as millimeters across a scan over an optical parametric oscillator's wavelength range. Beam walk compensation requires additional optical components, which then must also be scanned in precise angle vs. frequency relationships and must also maintain positional accuracy from day to day. These additional optical components further increase the expense of the system.

The above-described conventional system employs some form of feedback to control the frequency vs. angle relationship. Two different feedback methods have commonly been employed. In the first method the crystal angle is dithered (tilted back and forth rapidly and repeatedly). In the second method divergence (or convergence) of the laser beam and a split detector are employed.

In the dithering technique, the crystal angle is dithered at a rate less than the pulse rate of the laser (or if the laser is cw, higher frequencies may be used). As the crystal angle is modulated, the intensity of the output beam also becomes modulated because the incidence angle of the beam for a given frequency at the crystal varies from its perfect phase-matching condition to a less efficient angle. As a result, the efficiency of the SHG (or SFG) process varies sinusoidally. The dither angle must be small compared to the phase-matching acceptance angle of the crystal so that the variation in efficiency does not interfere with the overall process in which the frequency-doubled light is being used. It is also important, however, that the variation in efficiency (and therefor intensity) be large enough to detect. A photodiode or detector monitors the intensity of the output beam which is then compared to the dither signal (typically through lock-in detection) to derive an error or tracking signal. The phase difference of the dither and photodiode signals is used to track the phase-matching angle of the system. In most applications of tunable light sources, even a small amount of intensity modulation of the output beam is generally undesirable. This method is also not easily adaptable to cascade configurations, such as SHG followed by SFG as more fully described below, because one dithering process tends to confuse the other.

In the second feedback method, the laser beam is made slightly convergent or divergent. As a result of the convergence or divergence, only one ray of the beam enters the crystal at the phase-matching angle for a given frequency. Other rays experience less efficient SHG. If the crystal is precisely aligned, the beam's central ray enters the crystal at the efficient phase-matching angle, and the surrounding rays symmetrically see less efficiency. In this case, the output beam is symmetrical about the central ray. On the other hand, if the crystal is misaligned somewhat so that an off-axis ray enters the crystal at the phase-matching angle, the SHG or SFG process will be slightly more efficient on one side of the beam than the other. In such a case the overall efficiency is necessarily less. A split photodiode is used to monitor the harmonic output as a function of the crystal angle, indicating whether the crystal is oriented at the appropriate angle or not. The split diode also indicates in which direction the crystal must be tilted to improve efficiency. The signal from the split photodiode is used to generate an error signal for tracking the phase-matching angle as the input frequency changes. As the crystal is rotated, the signals on the two photodiodes of the split photodiode will change, corresponding to phase-matching of a particular angular component of the laser beam. The difference between these signals is used as an error signal. The error signal is then applied to a servo system that mechanically rotates the crystal to the proper phase-matching angle.

In this system, if the laser beam is perfectly collimated, each photodiode will always receive the same signal, making it impossible to derive an error signal for tracking. Thus, the success of this method depends critically on the divergence or convergence of the laser beam, which in turn can be a strong function of laser energy in lasers that exhibit effects such as thermal focusing. Furthermore, the system requires a servo loop with additional optics and mechanical components, thus increasing the complexity. Should the servo loop become unlocked, a time consuming search mode must be initiated. Moreover, rapid tuning is not possible with this technique. This method cannot be used for crystals such as Beta-Barium Borate (BBO), which have extremely narrow phase-matching acceptance angles. The narrow acceptance angle requires well collimated laser beams for high conversion efficiency. Moreover, this system can never achieve maximum efficiency, since it requires less than optimal SHG or SFG efficiency to produce the error signal with which to properly align the crystal.

The above two methods also fail to address the problem of beam walk as the crystal is rotated. It has been suggested that a second optical element (such as another SHG or SFG crystal or simply a piece of glass of some sort) be used to compensate the beam walk introduced by the rotation of the crystal by tuning the second optical element. However, many of the same problems will occur for this second optical element as well.

The instant invention provides an optical system that uses non-linear optical processes to overcome the above-described drawbacks of conventional systems. To achieve this, there is provided a passive optical system that achieves phase-matching for all frequencies to which a tunable laser can be tuned. Achromatic phase-matching techniques are employed such that the laser can be rapidly tuned, employed in a cascade operation (doubling followed by tripling) and does not require moving parts or feedback to the tunable laser source. The optical system in accordance with the instant invention achieves instantaneous tuning since the apparatus simultaneously attains phase-matching at all relevant frequencies. Cascade operation is straightforward since the dispersing of the rays required for a sum-generation process is already achieved in the second harmonic generation process. Since there are no moving parts, once the system is aligned it remains aligned much better than a system containing moving parts.

SUMMARY OF THE INVENTION

A system according to the invention for producing light having a desired characteristic, includes a nonlinear medium, responsive to light incident thereon at a plurality of frequencies to produce altered light having the desired characteristic. Each of the plurality of frequencies has an associated optimally efficient incidence angle with respect to the nonlinear medium. The system according to the invention also includes a narrow band light source tunable to each of the plurality of frequencies. An optical system is arranged to receive light from the light source and to direct the light from the light source to the nonlinear medium. Light at each of the plurality of frequencies passes through the optical system along a unique path such that each of the plurality of frequencies is incident on the non-linear medium at the associated optimally efficient incidence angle. The nonlinear medium can be a second harmonic generation crystal. Each of the plurality of frequencies is frequency doubled by the crystal such that the generated light is a light beam having a frequency twice that of the frequency output by the tunable light source. The optical system can include a plurality of prisms with a first prism arranged to receive the light from the light source and additional prisms or lenses arranged to direct light from the optical system to be incident on the nonlinear medium at the associated optimally efficient incidence angle.

BRIEF DESCRIPTION OF THE DRAWINGS

The instant invention will be better understood by reference to the detailed description of various embodiments according to the invention with reference to the following drawings in which.

DETAILED DESCRIPTION OF THE PREFERRED EMBODIMENTS

Figure 2:
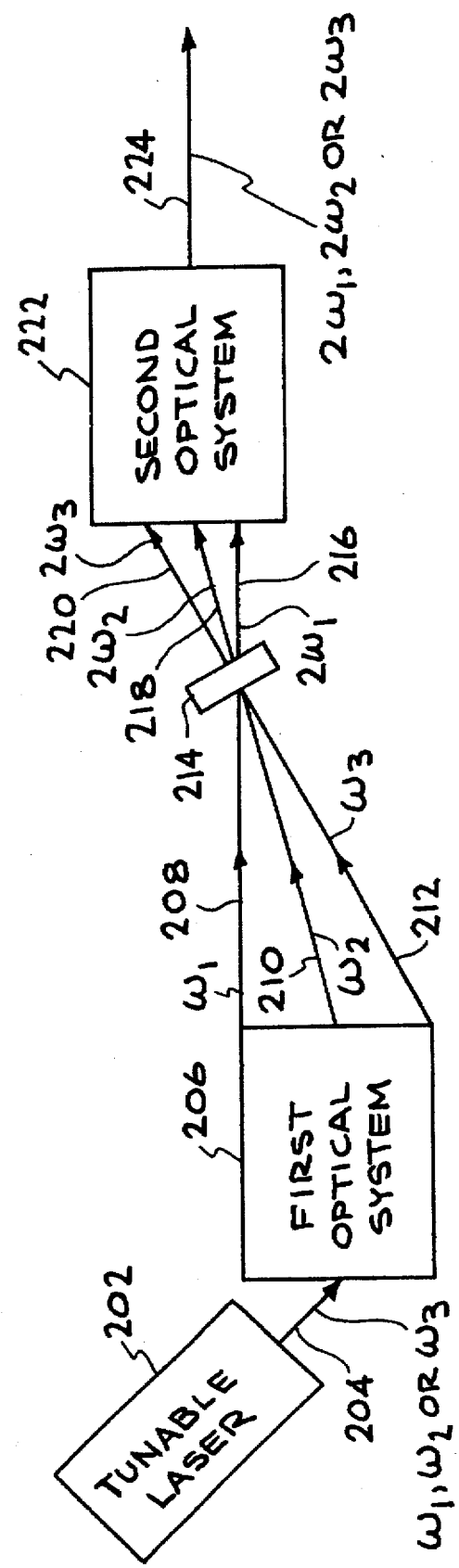
FIG. 2 illustrates an apparatus according to a first embodiment of the instant invention.

FIG. 2 illustrates a first embodiment of a system employing SHG with a tunable laser source. In FIG. 2, a tunable laser 202 produces a beam of light 204 which can be tuned to a plurality of different frequencies $\omega_1$–$\omega_3$. The light beam 204 is incident upon a first optical system 206. The first optical system 206 is constructed such that different frequencies of light (i.e., $\omega_1$, $\omega_2$, and $\omega_3$) travel through the first optical system 206 along different paths. As illustrated in FIG. 2, when the tunable laser 202 is tuned to light at frequency $\omega_1$ (i.e., when the input beam 204 is at a frequency $\omega_1$) the input light exits from the first optical system 206 along light path 208. Similarly, when the tunable laser 202 is tuned to a frequency $\omega_2$ or $\omega_3$, the light beam will exit the first optical system along paths 210 or 212, respectively. Each of the light paths 208, 210 and 212 direct the light beam to a second harmonic generation (SHG) crystal 214. The SHG crystal 214 frequency doubles the light as it passes through the crystal. The SHG crystal is a nonlinear optical medium such as KDP ($KH_2PO_4$) or BBO (betabarium borate). In general the principles here are applicable to any nonlinear effect where there is a dependency of the desired incidence angle on frequency.

In the above system, when the tunable laser 202 is tuned to light at a frequency $\omega_1$, light at frequency $\omega_1$ exits the system along light beam path 208 and is incident upon the SHG crystal 214. The SHG crystal doubles the frequency of the incident light to produce light at a frequency $2\omega_1$ along light beam path 216. Similarly, light incident upon the SHG crystal having a frequency of $\omega_2$ along path 210 or $\omega_3$ along path 212 exits the SHG crystal at a frequency of $2\omega_2$ along path 218 or $2\omega_3$ along path 220, respectively.

A second optical system 222 is provided to receive the frequency-doubled output from the SHG crystal 214. The second optical system 222 receives light at each of the respective frequencies $2\omega_1$–$2\omega_3$ along light paths 216, 218, 220 and directs the received light along a path unique to the given frequency through the second optical system 222 such that an output beam 224 is produced which contains the frequency-doubled light at a constant angle regardless of the input frequency. In this manner, the tunable laser 202 can be selectively tuned to light at one of the frequencies $\omega_1$, $\omega_2$, or $\omega_3$ to produce an output light beam at a frequency of twice the selected frequency of the tunable laser 202. In this manner, the system of FIG. 2 acts as a tunable light source for producing light at a selected frequency of $2\omega_1$, $2\omega_2$ or $2\omega_3$.

The first optical system 206, the SHG crystal system 214 and the second optical system 222 can be separate from the light source and used with a number of different tunable lasers 202. In fact, the arrangement can also be used with a broad band light source simultaneously producing the plurality of frequencies, as described in the above-referenced copending application. Alternatively, the arrangement of optical systems and SHG crystal can be formed integral with a tunable laser source as a complete tunable laser light source producing light at frequencies in a desired range which is otherwise difficult to produce (e.g., ultraviolet).

Figure 1:
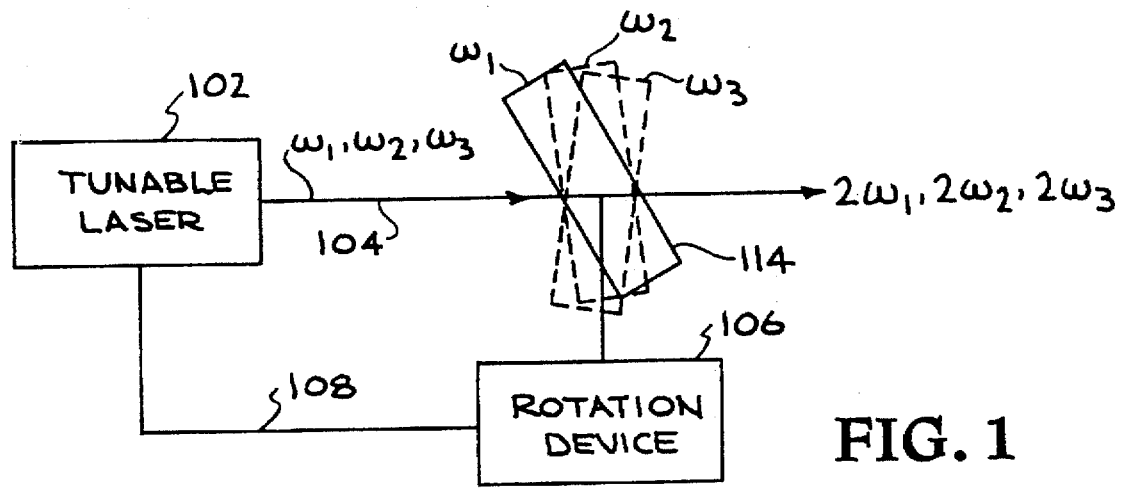
FIG. 1 illustrates a conventional apparatus used for second harmonic generation of tunable laser light.
Figure 3:
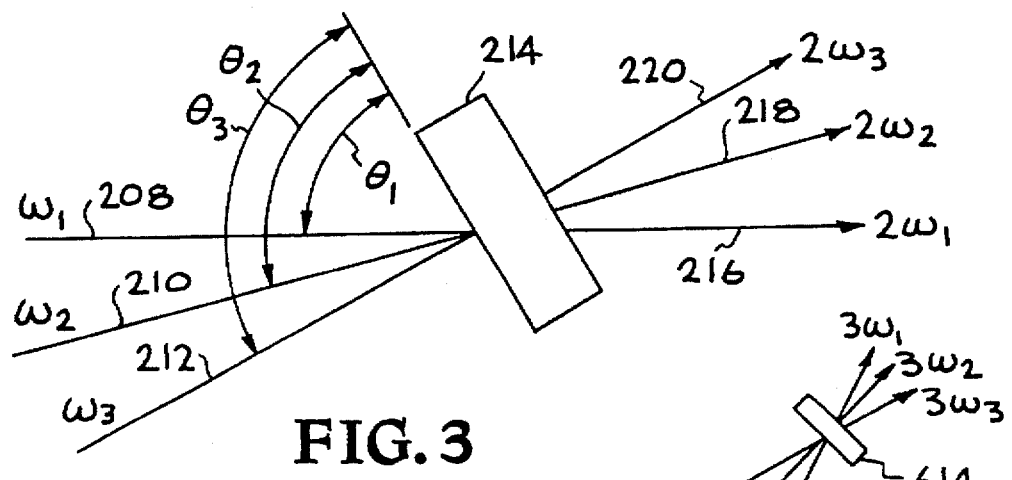
FIG. 3 illustrates the incidence angle dependency of various frequencies of light in the system of FIG. 2.

FIG. 3 illustrates the angle dependency of light at the various frequencies as they are made incident upon the SHG crystal 214. As illustrated in FIG. 3, when the tunable laser 202 is tuned to light at a frequency of $\omega_1$, the light travels along path 208 and is incident upon the SHG crystal 214 at an angle $\upsilon_1$ with respect to thereto. Similarly, when the input light is tuned to the frequency of $\omega_2$ the light is incident from the optical system 206 along path 210 onto the SHG crystal 214 at an angle $\upsilon_2$. When the light is tuned to the frequency $\omega_3$, the light travels along path 212 and is incident upon the SHG crystal 214 at an angle $\omega_3$. As discussed further herein, the first optical system can be constructed such that angles $\upsilon_1$, $\upsilon_2$, and $\upsilon_3$, respectively, correspond to the correct phase-matching angle for light at frequencies $\omega_1$, $\omega_2$, and $\omega_3$. In other words, regardless of the particular frequency to which the tunable laser 202 is set, the light exiting the first optical system is incident on the SHG crystal 214 at the phase-matching angle for high-efficiency frequency-doubling at that frequency. In this manner, a SHG process can be employed with a tunable laser light source which is optimally efficient even when the tunable laser is tuned over a broad range of frequencies.

It is noted, that in the above description, discrete frequencies $\omega_1$, $\omega_2$, and $\omega_3$ are discussed. These frequencies correspond to the center frequency of light output by the narrow band tunable laser light. Light at a fundamental frequency may actually correspond to a narrow band of frequencies centered about the fundamental frequency $\omega_1$. The bandwidth about the fundamental frequency $\omega_1$ output from the narrow-band tunable laser 202, however, is smaller than the phase-matching bandwidth of the SHG crystal 214 for the angle $\upsilon_1$. Thus, all light within the narrow band centered at the fundamental frequency $\omega_1$ is efficiently frequency-doubled when incident at angle $\upsilon_1$. The term frequency is used herein to refer to the fundamental frequency selected by tuning the tunable laser light source. An understanding of the bandwidth associated with that frequency is implicit in the discussion thereof.

Figure 4:
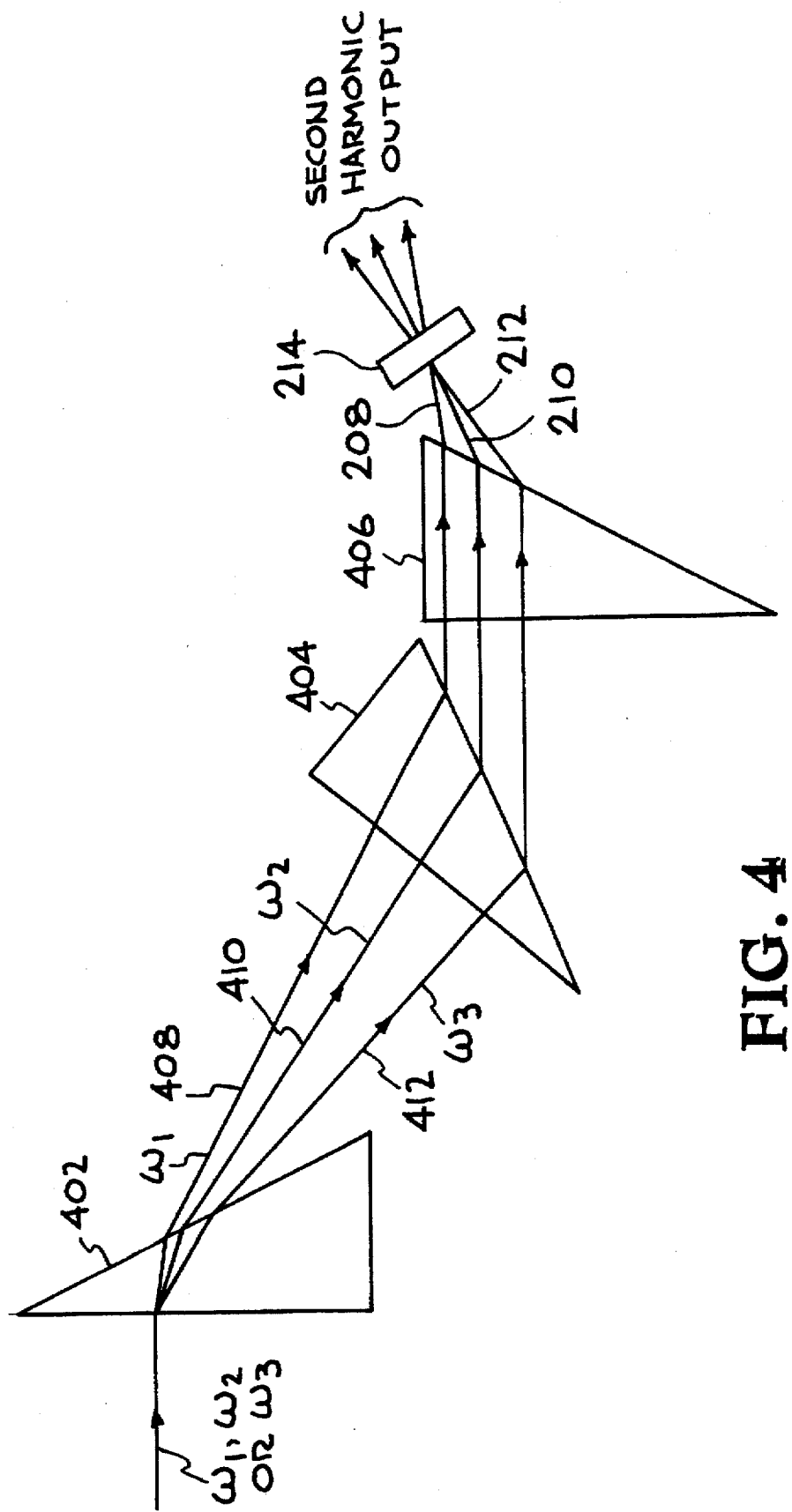
FIG. 4 illustrates an optical system for use in the system of FIG. 2.

FIG. 4 illustrates a more detailed embodiment of the first optical system 206 depicted in FIG. 2. In FIG. 4, the input beam 204 is incident upon a first Littrow prism 402 which bends the light to different paths depending on the frequency of the input beam 204. Accordingly, when the input beam 204 is tuned to the frequency $\omega_1$, the light exits the first prism 402 along beam path 408. The light exiting the first prism Littrow 402 is incident upon a second prism 404 and from there is incident upon a third prism 406 along the beam paths illustrated in FIG. 4. The light is output from the third prism 406 along a beam path 208 so as to be incident upon the SHG crystal 214 at the correct angle $\upsilon_1$ of incidence to achieve phase matching and maximize efficiency. Similarly, when the input beam is tuned to frequency $\omega_2$ or $\omega_3$ the light travels through these systems along beam paths 410 or 412, respectively, and is output along respective paths 210 or 212 at the appropriate phase-matching angle of incidence with respect to the SHG crystal 214 for the respective frequencies. Instead of prisms, diffraction gratings can be used to angularly separate the light at the different frequencies. Such systems, however, are less efficient due to the inefficiency of the gratings as opposed to the prisms which introduce no loss of efficiency to the system. In addition, instead of the second and third prisms, a lens telescope may be used. Other arrangements that yield the appropriate dispersion are also possible. Such designs are discussed in application Ser. No. 08/489,473 incorporated herein by reference and of which the present application is a continuation-in-part. When achromatic phase matching is used for tunable lasers, some restrictions that occur in its use for broadband light are not applicable. For example, the different rays need not overlap spatially the SHG crystal. Specifically, the crystal need not be placed precisely where the different frequencies overlap. In addition, group velocity dispersion need not be considered. Thus, some designs that do not work well for broadband or ultrashort pulse achromatic phase matching will work well in the tunable narrow-band case.

It can be understood from the first optical system depicted in FIG. 4, that no moving parts or change in orientation are required to produce the correct angle of incidence at the SHG crystal 214 as the light of the tunable laser 202 is tuned. Rather, the optical system automatically adjusts for the correct incidence angle on the basis of the frequency input into the optical system. Once the optical system is set up, no adjustment of the optical system is necessary to efficiently produce a second harmonic output from the SHG crystal 214. Accordingly, the output beam can be simply tuned to a desired frequency of $2\omega_1$ through $2\omega_3$ by tuning the tunable laser 202 to an input frequency of $\omega_1$ through $\omega_3$, respectively.

As shown in FIG. 4, the prisms can be arranged to achieve the desired angle. Oscar Martinez in Achromatic Phase Matching for Second Harmonic Generation of Femtosecond Pulses, IEEE Journal of Quantum Electronics Vol. 25, No. 12, Dec. 1989 and 6.52 abo and 2. Bor in Broadband Frequency Doubler for Femtosecond Pulses in Applied Physics B 50, 51–54 (1990) both incorporated herein by reference disclosed dispersing the beam to a particular direction.

While in FIG. 4, the input beam is shown as being tuned to three different frequencies, it is readily recognized that any number of frequencies can be used. The shown configuration provides for optimum phase matching for each of the frequencies selected by the tunable laser source. It is also readily recognized that the second optical system can be constructed to carry out the inverse operation of the optical system depicted in FIG. 4. More particularly, the light exiting the SHG crystal 214 is provided through three prisms oriented such that the output from the final prism for light at each of the frequencies $2\omega_1$ through $2\omega_3$ is directed along the same light beam path. In this manner, the output beam can be used as a tunable light source without a need to reconfigure the system in which the tunable light source is being used.

Figure 5:
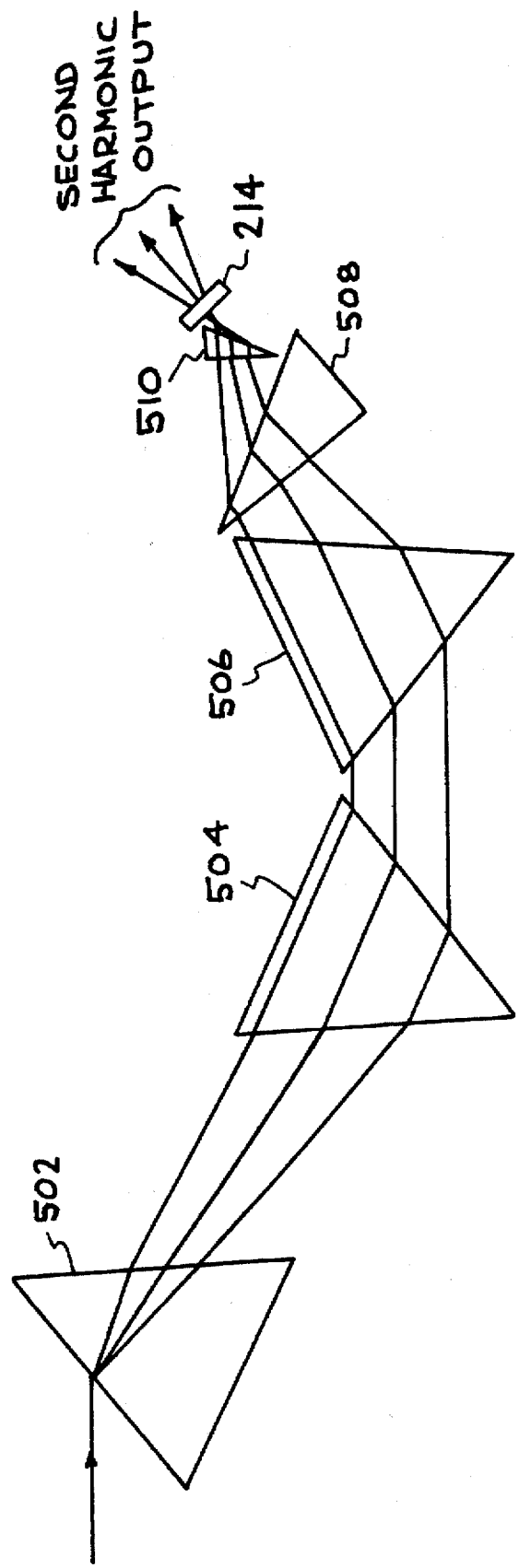
FIG. 5 illustrates another optical system for use in the system of FIG. 2.

FIG. 5 illustrates another optical system which can be used in the system depicted in FIG. 2. In FIG. 5, three Brewster prisms 502, 504 and 506 are used in conjunction with two Littrow prisms 508 and 510 to direct the input beam along different paths as it is tuned to the different frequencies such that the light is incident upon the SHG crystal 214 at the correct phase-matching angle for the selected frequencies.

Figure 6:
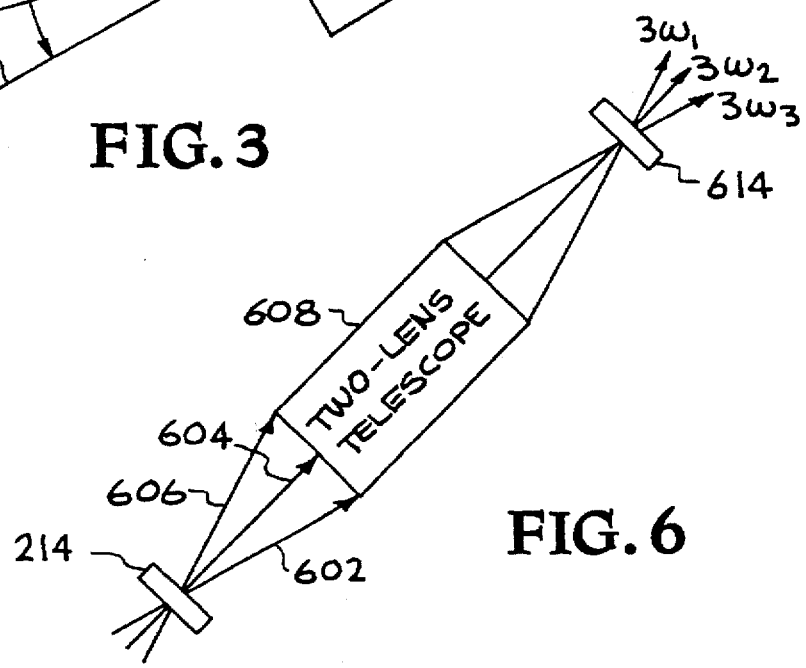
FIG. 6 illustrates another embodiment according to the invention.

FIG. 6 illustrates an apparatus according to an embodiment of the instant invention in which sum generation (i.e., third harmonic generation) is carried out to produce a beam of light with is easily tunable to frequencies at the third harmonic of a tunable laser light source.

In sum generation, light at the second-harmonic frequency is combined with light at the fundamental frequency to produce light at the third harmonic frequency. As illustrated in FIG. 6, a two-lens telescope 608 is placed after the SHG crystal 214. The light incident on the SHG crystal 214 may be directed using any of the phase-matching techniques described above. A sum-frequency generation (SFG) crystal 614 is provided after the telescope 608. An SFG crystal may comprise, for example, betabarium borate (BBO) or KDP ($KH_2PO_4$). The telescope 608 can be used to increase or decrease the beam dispersion of both the fundamental and second harmonic light, depending on whether the required dispersion at the sum-generation crystal is greater than or less than that required for SHG.

Sum generation can be easily and efficiently carried out in accordance with the instant invention, since, at the SHG crystal 214, each frequency $\omega$, spatially and angularly overlaps the beam created at $2\omega$ (output from the SHG crystal 214). In other words, the beam paths 602, 604 and 606 will have light at frequencies $\omega_1$ & $2\omega_1$, $\omega_2$ & $2\omega_2$, and $\omega_3$ & $2\omega_3$, respectively. The telescope 608 images these rays onto the sum-generation crystal with these frequencies still overlapped in both space and angle. Thus, the phase-matching optical systems directs the light though the SHG crystal 214 in such a manner that a sum-generation process using the SFG crystal 614 having a very high efficiency can be easily implemented to produce light at $3\omega_1$, $3\omega_2$ or $3\omega_3$, depending upon the frequency to which the tunable laser light source is tuned. Indeed, if the second-harmonic or fundamental light is also desired, it can be split off and reconstructed using known optical apparatus.

While specific embodiments of the invention have been described and illustrated, it will be clear that variations in the details of the embodiments specifically illustrated and described may be made without departing from the true spirit and scope of the invention as defined in the appended claims.

What is claimed is:

1. A system for producing light having a desired characteristic, comprising:

a nonlinear medium, responsive to light incident thereon at a plurality of frequencies to produce altered light having said desired characteristic, each of said plurality of frequencies having an associated optimally efficient incidence angle with respect to said nonlinear medium;

a light source tunable to said each of said plurality of frequencies; and an optical system arranged to receive light from said light source and to direct said light from said light source to said nonlinear medium, wherein light at each of said plurality of frequencies passes through said optical system along a unique path such that the light at each of said plurality of frequencies is incident on said non-linear medium at said associated optimally efficient incidence angle.

2. A system as recited in claim 1, wherein said nonlinear medium is a second harmonic generation crystal (SHG) and wherein the light at each of said plurality of frequencies is frequency doubled by said SHG crystal such that said altered light is a light beam having a frequency twice that of a frequency output by said tunable light source.

3. A system as recited in claim 1, wherein the optical system comprises a plurality of prisms including a first prism arranged to receive the light from the light source and a second prism arranged to direct light from the optical system to be incident on the nonlinear medium at said associated optimally efficient incidence angle.

4. A system comprising:

a light source generating an input light beam, the light source being selectively tunable to one of a plurality of different fundamental frequencies;

a second harmonic generation (SHG) crystal having a different acceptance angle for each of the different fundamental frequencies;

a first fixed optical system arranged between the light source and the SHG crystal, wherein said first fixed optical system comprises a plurality of optical elements arranged to provide that each different fundamental frequency of the light beam enters the SHG crystal at the correct acceptance angle; and wherein an output light beam exits the SHG crystal at a frequency twice the fundamental frequency of the input light beam to which the light source is tuned; and a second fixed optical system comprising a plurality of optical elements and arranged after the SHG crystal to receive the frequency-doubled output light beam from the SHG crystal and output the frequency-doubled light beam at a constant angle regardless of the frequency of the input light beam.

5. A system as recited in claim 4, further comprising a sum generation crystal, arranged to receive the output light beam at the frequency twice the fundamental frequency of the input light beam and to receive light at the fundamental frequency of the input light beam, to output a light beam at a frequency three times that of the fundamental frequency input light beam to which the light source is tuned.

6. A method of producing light tunable to at least first and second desired frequencies, the method comprising the steps of:

providing a tunable light source capable of selectively producing light at third and fourth frequencies;

directing an output from the tunable light source to an optical system;

passing light received by the optical system at the third frequency through the optical system along a first light path such that an output of the third frequency from the optical system is incident on a nonlinear medium at a first incidence angle with respect thereto, light at the third frequency being converted by the nonlinear medium to light at the first desired frequency;

passing light received by the optical system at the fourth frequency through the optical system along a second light path, different from the first light path, such that an output of the fourth frequency from the optical system is incident on the nonlinear medium at a second incident angle with respect thereto, light at the fourth frequency being converted by the nonlinear medium to light at the second desired frequency; and selectively tuning the tunable light source to input light to the optical system at one of the third and fourth frequencies as an input frequency to produce light as an output of the nonlinear medium at the first and second desired frequencies, respectively as an output frequency.

7. A method as recited in claim 6, further comprising the step of combining light at the input frequency with light at the output frequency in a second nonlinear medium to produce light at a frequency three times that of the input light frequency.

8. A method as recited in claim 6, wherein the output frequency is twice that of the input frequency.

* * * * *